US006026573A

United States Patent [19]
Macchione

[11] Patent Number: 6,026,573
[45] Date of Patent: Feb. 22, 2000

[54] METHOD FOR MANUFACTURING A SIDE RAIL FOR A VEHICLE FRAME ASSEMBLY

[75] Inventor: Charles R. Macchione, Richland, Pa.

[73] Assignee: Dana Corporation, Toledo, Ohio

[21] Appl. No.: 09/078,343

[22] Filed: May 13, 1998

Related U.S. Application Data

[60] Provisional application No. 60/046,698, May 14, 1997.

[51] Int. Cl.[7] ........ B23P 15/12

[52] U.S. Cl. ........ 29/897.2; 29/557; 72/340; 72/379.2

[58] Field of Search ........ 29/897.2, 557; 72/340, 379.2, 331, 332; 296/203, 204

[56] References Cited

U.S. PATENT DOCUMENTS

| | | | |
|---|---|---|---|
| 671,537 | 4/1901 | Carliss . | |
| 679,759 | 8/1901 | Lanz | 72/332 |
| 1,008,940 | 1/1911 | Best | 72/331 |
| 1,202,826 | 10/1916 | Gartshore . | |
| 1,475,328 | 11/1923 | Wales . | |
| 1,680,467 | 8/1928 | Matheson | 72/332 |
| 1,727,999 | 9/1929 | Moorhouse . | |
| 2,620,744 | 12/1952 | Gray et al. | 29/897.2 |
| 3,156,034 | 11/1964 | Gruetjen | 29/897.2 |
| 3,209,432 | 10/1965 | Cape | 29/897.2 |
| 4,653,796 | 3/1987 | Koenig et al. . | |
| 4,966,029 | 10/1990 | Zbornik | 72/379.2 |
| 4,967,473 | 11/1990 | Wessel | 29/897.2 |
| 5,174,146 | 12/1992 | Heurteboust et al. | 72/379.2 |
| 5,187,967 | 2/1993 | Singh et al. | 72/340 |
| 5,211,047 | 5/1993 | Kaneyuki | 72/379.2 |
| 5,271,142 | 12/1993 | Moore, III et al. | 29/897.2 |
| 5,548,883 | 8/1996 | Saijo et al. | 72/379.2 |
| 5,561,902 | 10/1996 | Jacobs et al. | 29/897.2 |
| 5,592,848 | 1/1997 | Bodnar | 72/379.2 |

FOREIGN PATENT DOCUMENTS

| | | | |
|---|---|---|---|
| 56-154222 | 11/1981 | Japan | 72/379.2 |
| 58-187215 | 11/1983 | Japan | 72/379.2 |
| 3-146226 | 6/1991 | Japan | 72/379.2 |
| 27121 | 11/1914 | United Kingdom | 29/897.2 |

*Primary Examiner*—I. Cuda
*Assistant Examiner*—Trinh T. Nguyen
*Attorney, Agent, or Firm*—MacMillen, Sobanski & Todd, LLC

[57] ABSTRACT

A method for manufacturing a side rail in a vehicle frame assembly includes the initial step of roll forming flat stock to form a side rail having a C-shaped cross section defined by an upper flange corresponding to the top open side of the C-shape, a lower flange corresponding to the bottom or opposite open side of the C-shape, and a web corresponding to the back of the C shape and connecting the upper flange and the lower flange. The terminal edges of the upper flange and the lower flange define an edge plane that extends generally parallel to a vertical plane defined by the web. A portion of the lower flange is then stamped in a direction parallel to the vertical plane to form a kick-up in portion in the lower flange. The edge plane defined by the edges of the upper and lower flanges in the kick-up portion does not extend at the predetermined relationship relative to the plane defined by the web. Then, a portion of the lower flange in the kick-up portion is removed, such as by trimming with a cutting torch, such that the edge plane defined by the edges of the upper and lower flanges in the kick-up portion again extends at the predetermined relationship relative to the plane defined by the web.

11 Claims, 2 Drawing Sheets

METHOD FOR MANUFACTURING A SIDE RAIL FOR A VEHICLE FRAME ASSEMBLY

CROSS REFERENCE TO RELATED APPLICATION

This application claims the benefit of U.S. Provisional Application Ser. No. 60/046,698, filed May 14, 1997.

BACKGROUND OF THE INVENTION

This invention relates to methods for manufacturing vehicle frame components. More specifically, this invention relates to an improved method for manufacturing a side rail for use in a vehicle frame assembly.

Most land vehicles in common use, such as cars and trucks, use a frame that serves as a platform upon which the remainder of the vehicle is built. Many vehicle frame structures are known in the art. Most known structures are formed from a number of individual metallic components that are permanently joined together. For example, a typical perimeter vehicle frame assembly is composed of a pair of longitudinally extending side rails that are joined together at the front and rear by a pair of transversely extending cross members. Additional connections between the side rails are made at intermediate locations using one or more intermediate or auxiliary cross members. The cross members not only connect the two side rails together, but also provide desirable lateral and torsional rigidity to the vehicle frame assembly.

In some vehicle frame assemblies, the side rails and cross members are formed from open channel structural members, i.e. structural members that have a non-continuous cross sectional shape. A typical open channel structural member is C-shaped in cross section. In a frame assembly, such a structural member is positioned so that the open legs of the "C", called the upper and lower flanges, are essentially parallel to the ground. The upper and lower flanges are connected to each other by a web (the back of the "C"). The web forms a plane that is perpendicular to the ground. In an open channel structural member, the edges of the flanges define a plane that is parallel to the plane defined by the web.

For certain vehicle applications, it is desirable to deform a portion of the side rail to provide a deformation or kick-up portion in one of the flanges. This kick-up portion provides clearance for vehicle components, such as a rear axle and drive train assembly. It is often desirable that the side rail have a kick-up in a portion of the lower flange only and the upper flange remain straight.

To manufacture a C-shaped open channel structural member, an elongated flat steel stock is stamped to the desired shape. For example, it is known to form a C-shaped member as a structural component for vehicle frames including an upper flange that extends horizontally the length of the side rail, and a lower flange that extends horizontally the length of the rail, except for the kick-up portion. The edges of these flanges form a plane that is parallel to the plane defined by the web.

In order to stamp C-shaped members of the required length, particularly for use in sport utility vehicles, vans, and trucks, relatively long dies that extend the total length of the side rail are required. Unfortunately, a large industrial press must be used to handle such long dies. And the formation of side rails of different configurations for different vehicles requires multiple dies. Although the technology of stamping using large dies and presses is well known, the scale makes the overall process expensive. Thus, it would be desirable to provide a method of manufacturing C-shaped structural members for use as side rails in vehicle frames that is less expensive than a large scale stamping operation. It would also be desirable to provide a method of manufacturing C-shaped structural members for use as side rails that is easily scalable to different vehicle sizes.

SUMMARY OF THE INVENTION

This invention relates to a method for manufacturing a side rail in a vehicle frame assembly. Initially, flat stock is roll formed to form a side rail with a C-shaped cross section having an upper flange corresponding to the top open side of the C-shape, a lower flange corresponding to the bottom or opposite open side of the C-shape, and a web corresponding to the back of the C shape and connecting the upper flange and the lower flange. The outer edges of the upper flange and the lower flange define a plane that extends parallel to a vertical plane defined by the web. A portion of the lower flange is stamped in a direction parallel to the vertical plane to form a kick-up in the lower flange. The kick-up has a protruding edge extending beyond the edge plane. This protruding edge is then trimmed so as to extend flush with the plane defined by the outer edges of the upper flange and the lower flange as originally formed.

DETAILED DESCRIPTION OF THE PREFERRED EMBODIMENT

Figure 1:
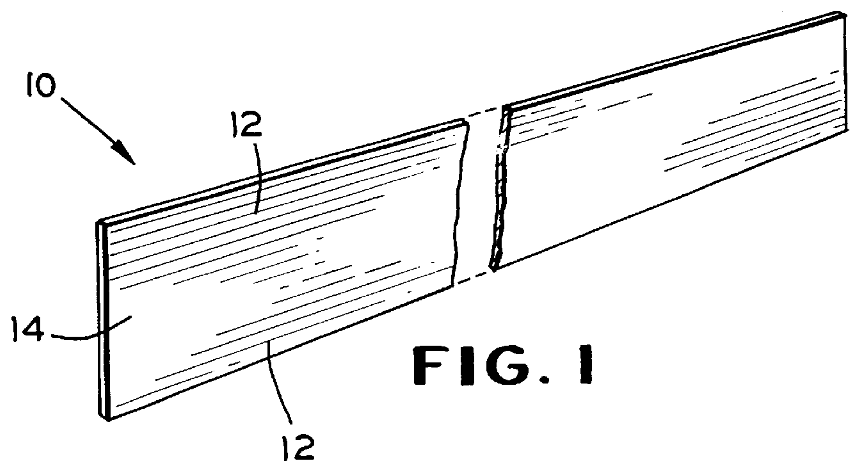
FIG. 1 is a perspective view of a length of flat stock from which a side rail in accordance with this invention is formed.

The formation of a side rail for a vehicle frame assembly in accordance with this invention starts with a length of flat stock 10, as shown in FIG. 1. This flat stock 10 can be any material that can be roll formed and stamped that is suitable for a vehicle frame. For example, the flat stock 10 can be formed from steel or steel alloys. The length of this flat stock 10 preferably corresponds generally to the length of the side rail for the vehicle frame, but can be any convenient length. The flat stock 10 has a pair of longitudinal edge portions 12 and a longitudinally extending central portion 14.

Figure 2:
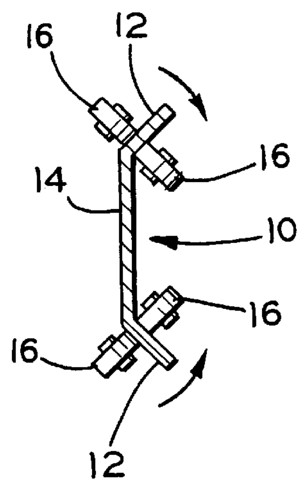
FIG. 2 is a schematic view illustrating a roll forming process where the edges of the flat stock of FIG. 1 are being formed at an angle to the central portion of the flat stock.
Figure 3:
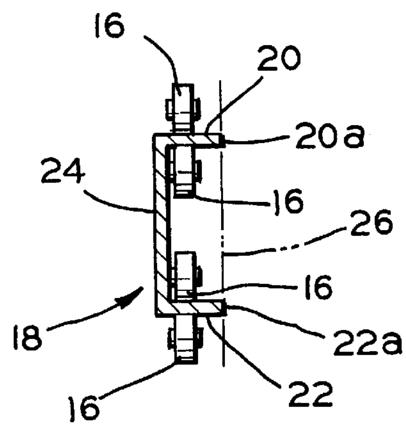
FIG. 3 is a schematic view further illustrating the roll forming process, where the flat stock of FIG. 1 is formed into a generally C-shaped channeled side rail.

FIGS. 2 and 3 illustrate the next step in forming a side rail in accordance with this invention. First, as shown in FIG. 2, the edge portions 12 are bent or formed throughout the length of the flat stock 10 so as to extend at an angle with respect to the central portion 14. In the roll forming process illustrated in FIGS. 2 and 3, the flat stock 10 is fed through a series of spaced apart rollers 16 to accomplish this. Preferably, a series of opposed pairs of rollers 16 are positioned on opposed sides of the edge portions 12 of the flat stock 10. The pairs of rollers 16, adjacent to one another along the feed direction, are positioned at an offset relationship. When the flat stock 10 is fed through the series of rollers 16, the edge portions 12 are forced to conform to the positioning of the rollers 16. The series of rollers 16 are positioned so that the initially flat length of stock 10 is progressively formed into an elongated channeled side rail 18 having a generally C-shaped cross section, as shown in FIG. 3.

As shown in cross section in FIG. 3, the formed side rail 18 has a horizontally extending upper flange 20 and a horizontally extending lower flange 22 that are connected together by a vertically extending web 24. The upper and lower flanges 20 and 22 are formed from the edge portions 12 of the stock 10, and the web 24 is formed from the central portion 14 of the stock. The upper and lower flanges 20 and 22 terminate in longitudinally extending edges 20*a* and 22*a* that define a vertical plane 26 that extends parallel to the vertical plane defined by the web 24. Thus, the widths of the upper and lower flanges 20 and 22 are approximately equal along the length of the side rail 18. Preferably, the side rail 18 is roll formed so that the upper and lower flanges 20 and 22 extend at right angles with respect to the web 24.

Figure 4:
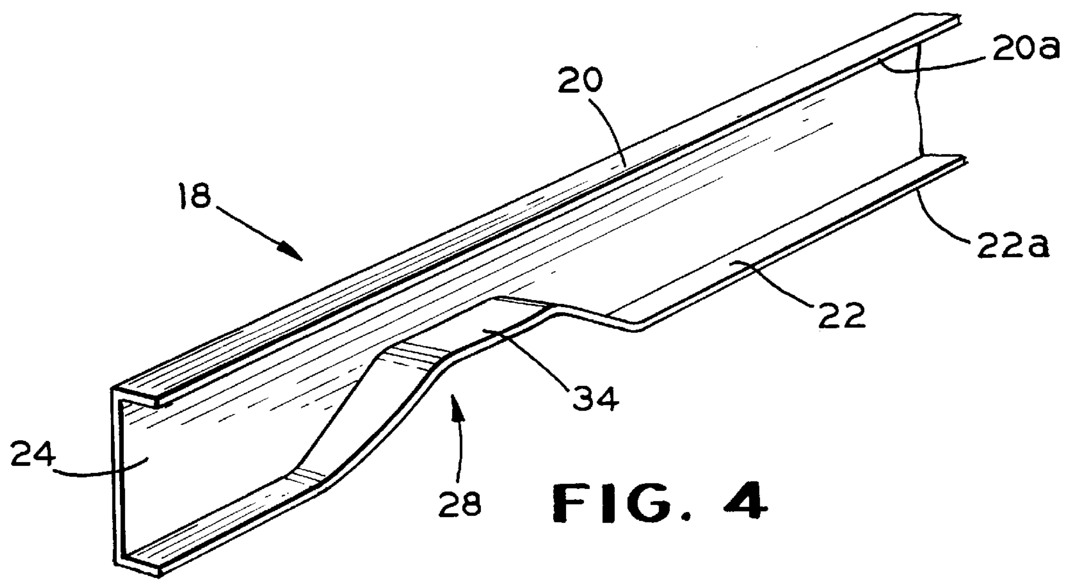
FIG. 4 is a perspective view of a side rail formed with a kick-up portion.
Figure 6:
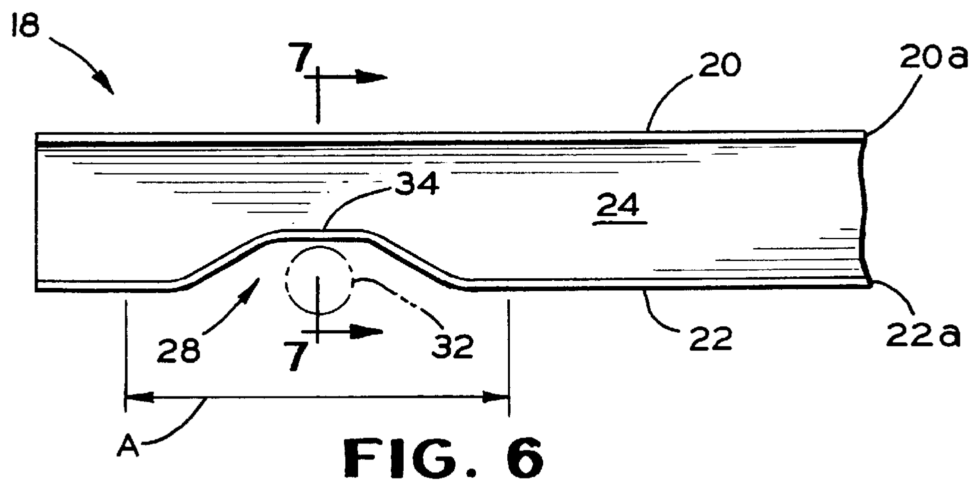
FIG. 6 is a side view of the side rail of FIG. 4.

After the C-shaped side rail 18 is formed, a kick-up portion 28 is formed in the lower flange 22 and a portion of the web 24 of the side rail 18, as shown in FIG. 4. The kick-up portion 28 is formed by stamping the side rail 18 in such a manner that the upper flange 20 continues to extend horizontally throughout the entire length of the side rail and the lower flange 22 extends horizontally the entire length of the side rail except for the kick-up portion 28, as shown in FIG. 6. The function of the kick-up portion 28 is to provide clearance for components, such as an axle 32, positioned beneath the side rail 18 of the finished frame.

To stamp the kick-up portion 28, only a localized area (indicated by the region "A" in FIG. 6) of the side rail 18 needs to be stamped. Thus, the die(s) required to form the kick-up portion, and the stamping press, can be relatively short compared to the total length of the side rail 18. Also, the same die may be used for forming the kick-up in side rails for vehicles using similarly sized axles regardless of the length of the side rail 18 for an obvious cost advantage.

Figure 5:
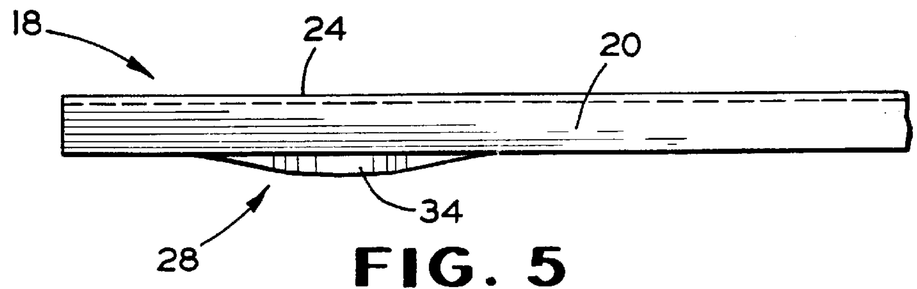
FIG. 5 is a top plan view of the side rail of FIG. 4.
Figure 7:
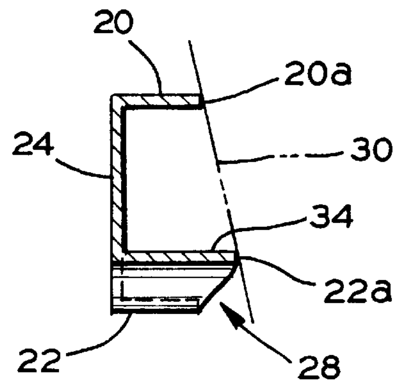
FIG. 7 is a sectional view taken along lines 7—7 of FIG. 6.

In the area of the kick-up portion 28, the edges 20*a* and 22*a* generally define a plane 30 that is angled relative to the vertical plane defined by the web 24, as shown in FIG. 7. Because of the degree of height in the side rail 18 in the area of the kick-up portion 28, the stamping process displaces material and forms a protrusion 34 in the lower flange 22. This protrusion 34 extends along the length of the edge 22*a* of the lower flange 22 adjacent to the kick-up portion 28 as best seen in FIGS. 4, 5, and 7.

Figure 8:
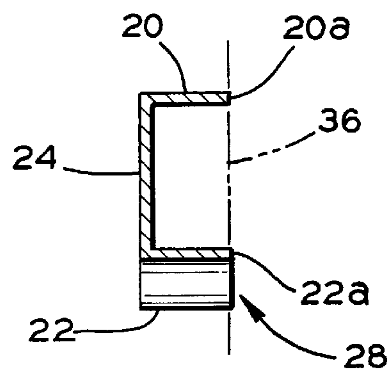
FIG. 8 is a sectional view of the side rail of FIG. 4, where the lower flange has been trimmed so that the longitudinal edge of the lower flange and the longitudinal edge of the upper flange form a plane parallel to the plane of the web.
Figure 9:
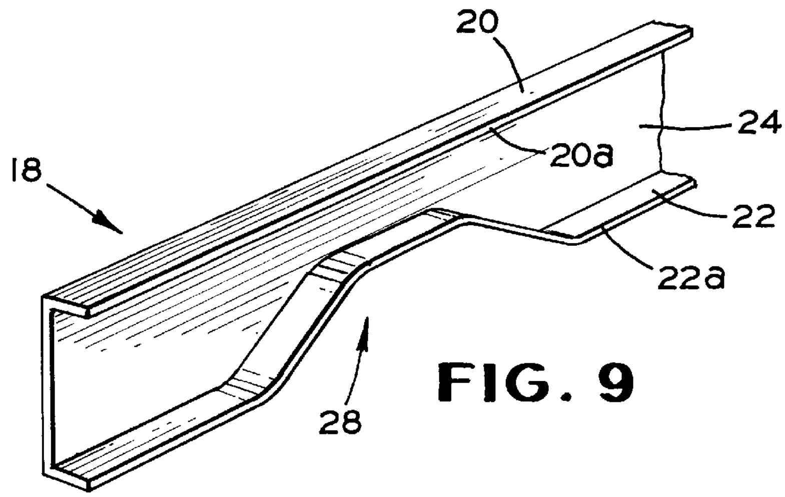
FIG. 9 is a perspective view of the side rail of FIG. 8.

It is generally desirable to have a side rail 18 having an upper edge 20*a* and a lower edge 22*a* (of the upper flange 20 and the lower flange 22, respectively) define a plane that is uniformly parallel along the length of the side rail 18 to the plane defined by the web 24, as shown in FIG. 8 and FIG. 9 (referred to herein as an edge plane). This can be accomplished by removing the protrusion 34 by any suitable method, such as with a cutting torch.

It is understood that the C-shape of the invention encompasses a variety of open end shapes. Although the upper edge 20*a* and the lower edge 22*a* are illustrated as being flat planes that join the web at right angles, the upper edge 20*a*, the lower edge 22*a*, and the web 24 may be somewhat curved and define angles other than right angles. Further, the planes defined by the web, and the upper edge and lower edge, as discussed above as well as the horizontal surfaces of the upper and lower edges are illustrated as exactly conforming to their defining surface. In fact, the invention is intended to include planes and the horizontal surfaces that are only approximations of their defining part. Also, although the edge planes 26 and 36 defined by the outer edges of the upper and lower flanges 20*a* and 22*a* at the beginning and end of the method extend generally parallel to the vertical plane defined by the web 24, it will be appreciated that such edge planes 26 and 36 may extend at any desired relationship, parallel or non-parallel, relative to the plane defined by the web 24.

The method of the present invention results in a side rail for a vehicle frame that is generally C-shaped defined by a lower flange on the underside of the frame and an upper flange on the top side of the frame. Both the lower flange and the upper flange extend horizontally the length of the side rail. A web, extending as a vertical plane the length of the side rail, connects the lower and upper flanges. The lower flange and the upper flange each have a longitudinally extending edge, and together these edges define an edge plane that is parallel to the vertical plane of the web. The upper flange extends horizontally the entire length of the side rail. The lower flange extends horizontally the entire length of the side rail except for the kick-up portion. As used herein, the term "kick-up" refers to any depression in the side rail to accommodate vehicle components. This kick-up can be of any size, shape, or configuration necessary.

In summary, the starting material of the invention is a length of stock material appropriately sized. This stock is roll formed to create a C-shaped piece having a lower flange and an upper flange as described above. After this roll formation, both the lower flange and the upper flange extend horizontally the entire length of the piece. This piece is then stamped to create a kick-up in the lower flange. As a result of the material displaced in the stamping, the longitudinal edge of the lower flange extends beyond the longitudinal edge of the upper flange. The plane thus formed by the longitudinal edge of the lower flange and the longitudinal edge of the upper flange intersects the vertical plane formed by the web. In order to align the longitudinal edges of the lower and upper flanges, the extension of the edge of the lower flange is trimmed so that the edge plane formed by the longitudinal edges of the lower and upper flanges are aligned with the web.

In view of the above description, it is obvious that various alternative embodiments are possible using variations of the method described above without departing from the spirit and scope of the present invention. It is intended that the drawings, descriptions, and discussion contained in this specification illustrate the present invention rather than limit it. It is the following claims, including all equivalents, that define the scope of the invention.

What is claimed is:

1. A method for manufacturing a side rail in a vehicle frame assembly comprising the steps of:

(a) providing a length of stock defining a first flange, a second flange, and a web extending therebetween, the first and second flanges terminating in respective edges that define an edge plane extending at a predetermined relationship relative to a plane defined by the web;

(b) forming a kick-up portion in the first flange such that the edge plane defined by the edges of the first and second flanges in the kick-up portion does not extend at the predetermined relationship relative to the plane defined by the web; and (c) removing a portion of the first flange in the kick-up portion such that the edge plane defined by the edges of the first and second flanges in the kick-up portion extends at the predetermined relationship relative to the plane defined by the web.

2. The method defined in claim 1 wherein said step (a) is performed by providing an edge plane that extends generally parallel to the plane defined by the web.

3. The method defined in claim 1 wherein said step (a) is performed by providing a length of stock having a generally C-shaped cross section.

4. The method defined in claim 3 wherein the first and second flanges generally at right angles relative to the web.

5. The method defined in claim 1 wherein said step (a) is performed by roll forming a length of flat stock to provide the first and second flanges.

6. The method defined in claim 1 wherein said step (b) is performed by stamping the first flange.

7. The method defined in claim 6 wherein the first flange is stamped in a direction that is generally parallel to the plane defined by the web.

8. The method defined in claim 1 where the stock is formed from one of steel or steel alloy.

9. The method defined in claim 1 where the kick-up is configured to accommodate an axle.

10. The method defined in claim 1 where said step (c) is performed by trimming a portion of the first flange in the kick-up portion.

11. The method defined in claim 10 wherein the trimming is performed by a cutting torch.

* * * * *